United States Patent
Elbaz et al.

(10) Patent No.: US 11,377,975 B2
(45) Date of Patent: Jul. 5, 2022

(54) DEVICE AND METHOD FOR MONITORING THE LIFETIME OF A HYDRAULIC APPARATUS OF AN AIRCRAFT

(71) Applicant: SAFRAN AIRCRAFT ENGINES, Paris (FR)

(72) Inventors: Ruben Abraham Elbaz, Moissy-Cramayel (FR); Lancelot Guillou, Moissy-Cramayel (FR); Nicolas Andrea Fabbro, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/289,072

(22) PCT Filed: Oct. 29, 2019

(86) PCT No.: PCT/FR2019/052566
§ 371 (c)(1),
(2) Date: Apr. 27, 2021

(87) PCT Pub. No.: WO2020/089555
PCT Pub. Date: May 7, 2020

(65) Prior Publication Data
US 2022/0010687 A1    Jan. 13, 2022

(30) Foreign Application Priority Data
Oct. 31, 2018   (FR) ........................................ 1860113

(51) Int. Cl.
*F01D 21/00*   (2006.01)
*F01D 21/14*   (2006.01)
(Continued)

(52) U.S. Cl.
CPC ............ *F01D 21/003* (2013.01); *F01D 21/14* (2013.01); *F01D 25/12* (2013.01);
(Continued)

(58) Field of Classification Search
CPC ........ F01D 21/003; F01D 21/14; F01D 25/12; F05D 2220/323; F05D 2260/213;
(Continued)

(56) References Cited

U.S. PATENT DOCUMENTS

| 4,336,595 A | 6/1982 | Adams et al. |
| 7,433,789 B1 | 10/2008 | Balestra |

(Continued)

FOREIGN PATENT DOCUMENTS

| EP | 1 916 399 A2 | 4/2008 |
| EP | 2 390 742 A1 | 11/2011 |

(Continued)

OTHER PUBLICATIONS

International Search Report for PCT/FR2019/052566 dated Jan. 28, 2020 (PCT/ISA/210).
(Continued)

*Primary Examiner* — Mickey H France
(74) *Attorney, Agent, or Firm* — Sughrue Mion, PLLC

(57) ABSTRACT

The invention relates to a device for monitoring the lifetime of at least one hydraulic apparatus of an aircraft that is subject to ventilations in hydraulic pressure during flight, comprising an interface for receiving measurement data which are representative of hydraulic pressure (P). The invention is characterised in that the device comprises a processing device, comprising a means for detecting a pressure (P) load ($SOLL_{END}$) of a damaging nature, which load is defined by the fact that the pressure (P) comprises a pressure increase ($\Delta P_{AUG}$) that is greater than a predetermined damage threshold ($S_{\Delta P}$), followed by a pressure
(Continued)

Figure 1:
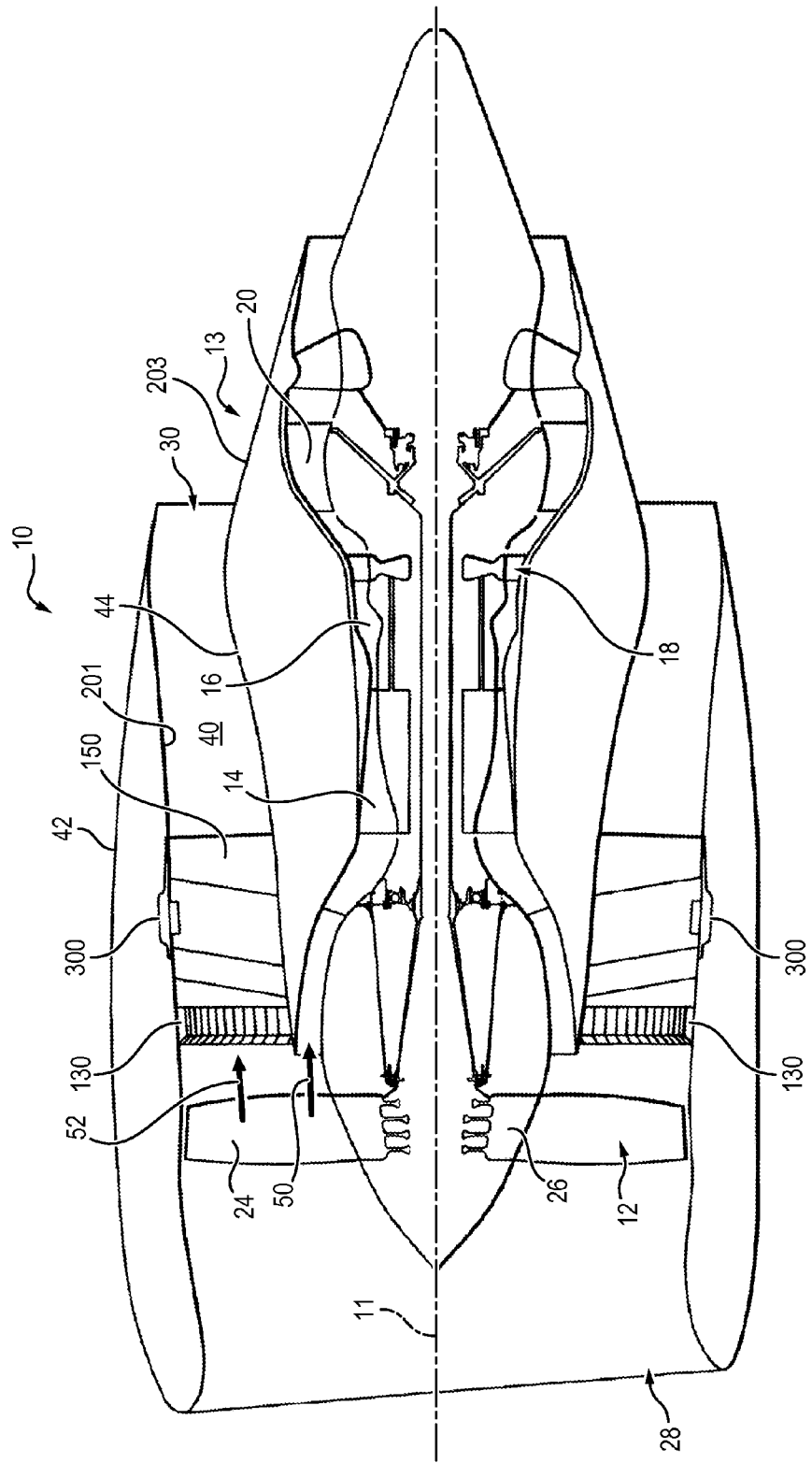

decrease ($\Delta P_{DIM}$) that is greater than the threshold ($S_{\Delta P}$), a means for calculating a pressure variation magnitude that is equal to the maximum increase ($\Delta P_{AUG}$) and the maximum decrease ($\Delta P_{DIM}$), a means for projecting the magnitude onto a decreasing curve or straight line of a damage model in order to determine the permissible number of loads corresponding to the magnitude, a means for calculating a potential damage ratio that is equal to a number of reference loads divided by the permissible number, a means for increasing a count of accumulated ratios by said ratio.

15 Claims, 6 Drawing Sheets

(51) Int. Cl.
  *F01D 25/12* (2006.01)
  *G01M 15/14* (2006.01)
  *G05B 23/02* (2006.01)

(52) U.S. Cl.
  CPC .. *F05D 2220/323* (2013.01); *F05D 2260/213* (2013.01); *F05D 2260/80* (2013.01); *F05D 2270/301* (2013.01); *F05D 2270/332* (2013.01); *F05D 2270/71* (2013.01); *G01M 15/14* (2013.01); *G05B 23/0283* (2013.01)

(58) Field of Classification Search
  CPC ........... F05D 2260/80; F05D 2270/301; F05D 2270/332; F05D 2270/71; F05D 2270/11; G01M 15/14; G01M 99/007; G05B 23/0283; G06Q 10/20
  See application file for complete search history.

(56) References Cited

U.S. PATENT DOCUMENTS

| | | | |
|---|---|---|---|
| 8,706,428 | B1 | 4/2014 | Righi |
| 2007/0295098 | A1 | 12/2007 | Balestra |
| 2015/0227659 | A1 | 8/2015 | Andersson et al. |
| 2020/0049595 | A1* | 2/2020 | Sakai ..................... G06Q 50/06 |
| 2020/0125123 | A1* | 4/2020 | Anderson .............. G05D 16/20 |

FOREIGN PATENT DOCUMENTS

| | | |
|---|---|---|
| JP | 2001108669 A | 4/2001 |
| WO | 2013/191594 A1 | 12/2013 |

OTHER PUBLICATIONS

Written Opinion for PCT/FR2019/052566 dated Oct. 29, 2019 (PCT/ISA/237).

* cited by examiner

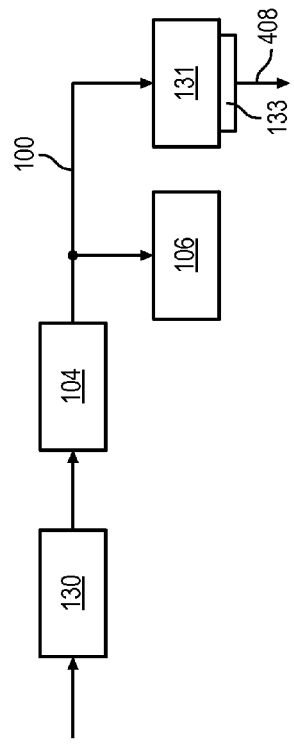
FIG. 8
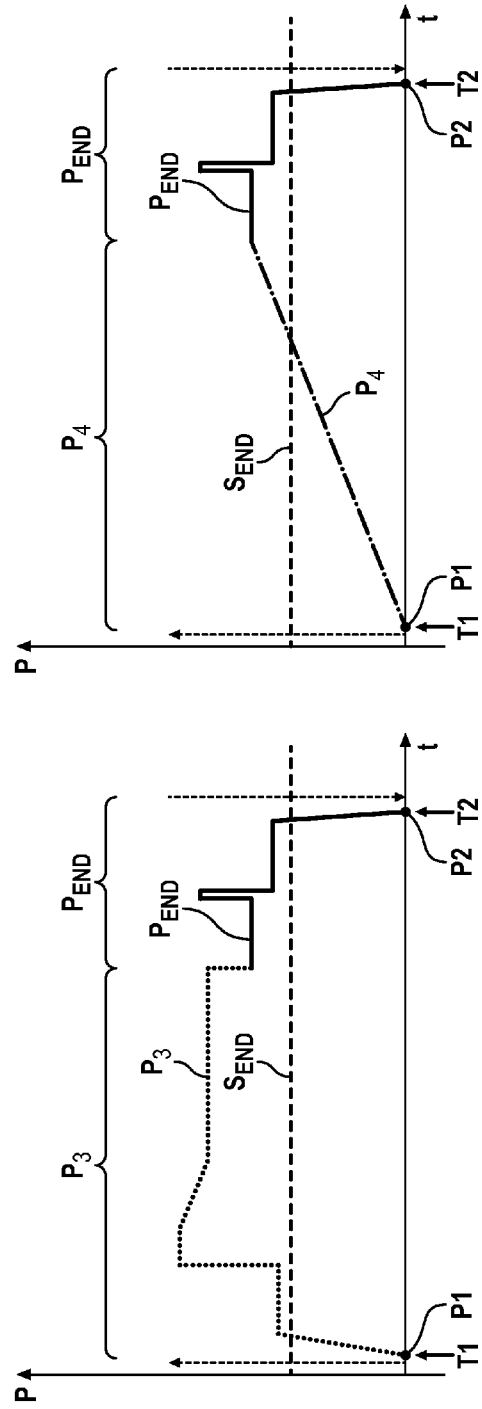
FIG. 9
FIG. 10

DEVICE AND METHOD FOR MONITORING THE LIFETIME OF A HYDRAULIC APPARATUS OF AN AIRCRAFT

CROSS REFERENCE TO RELATED APPLICATIONS

This is a National Stage of Application No. PCT/FR2019/052566 filed Oct. 29, 2019, claiming priority based on France Patent Application No. 1860113 filed Oct. 31, 2018, the entire contents of each of which being herein incorporated by reference in their entireties.

The invention relates to a device and method for monitoring the lifetime of at least one hydraulic apparatus of an aircraft subjected to variations of hydraulic pressure in flight.

One field of application of the invention is the maintenance of aircrafts, particularly those equipped with turbojets.

In particular, the hydraulic apparatus can be a heat exchanger, positioned in the secondary flow as an additional source of cooling of this apparatus, in an aircraft turbojet. An exchanger of this type is known for example from document EP-A-1 916 399.

The invention seeks to obtain a device and a method for monitoring the lifetime of at least one apparatus, allowing tracking the fatigue of the hydraulic apparatus, to be able to carry out preventive maintenance of this apparatus. In fact, preventive maintenance of this type, consisting of monitoring the state of health of the apparatus to replace or repair it sufficiently early, allows reducing in-flight shutdowns, the rate of aircraft on ground and the rate of delays and cancellations of flights, this reduction being crucial to the profitability of a turbojet.

To this end, a first object of the invention is a device for monitoring the lifetime of at least one hydraulic apparatus of an aircraft subjected to variations of hydraulic pressure in flight, the device comprising an interface for receiving measurement data representative of the hydraulic pressure of the apparatus as a function of flight time, characterized in that the apparatus comprises a processing device comprising a means for detecting, based on the measurement data, a pressure load of a damaging nature, defined by the fact that the pressure comprises a pressure increase, greater than a predetermined damage threshold greater than zero, followed by a pressure reduction greater than the predetermined damage threshold, a means for calculating a pressure variation amplitude, equal to the maximum of the absolute value of the pressure increase of the pressure load of a damaging nature and of the absolute value of the pressure reduction of the pressure load of a damaging nature, a means for projecting the pressure variation amplitude onto a prescribed decreasing curve of damage model or a prescribed decreasing straight line of damage model, giving a permissible number of pressure loads of a damaging nature as a function of the pressure variation amplitude, for determining the permissible number of pressure loads of a damaging nature corresponding to the pressure variation amplitude which has been calculated, a calculating means for calculating a potential damage ratio, equal to a determined number of reference loads, divided by the permissible number of pressure loads of a damaging nature which has been calculated, a means for incrementing a cumulative potential ratio counter by the potential damage ratio which has been calculated.

Wear due to fatigue of the hydraulic apparatus of aircraft engines over the hours of operation of the engine is directly linked not only to the number of loads that they are subjected to, but also on the amplitude of the pressure variations during each cycle. The invention thus allows quantifying individually the severity of the loads of a damaging nature for each flight.

The invention allows developing aging predictors, allowing the introduction of means dedicated to predictive maintenance.

The cumulative damage ratio, calculated by the counter, allows estimating the remaining lifetime of an apparatus in operation.

The invention thus allows a statistical verification of the lifetime noted in service for the hydraulic apparatuses of the aircraft, a categorization of the aircraft engines equipped with the hydraulic apparatus to know which aircraft fleets and operating conditions generate the greatest fatigue in the apparatus and consequently generate the quickest aging of the apparatus. The data originating in the detected pressure loads of a damaging nature produced by the invention, coupled with information relating to the conditions in which the fleets operate, allow supplying estimates regarding the aging and the remaining lifetime of the hydraulic apparatuses, thus allowing the implementation of predictive maintenance.

In case of quality problems, non-compliant repairs or rework or the use of parts not guaranteed or supplied by unofficial sources, the statistical knowledge of the aging rate of the apparatuses contributed by the employment in service of the invention will moreover facilitate the highlighting of the gap in fatigue behavior relative to the reference parts and the detection of anomalies regarding the lifetime of an apparatus.

The invention allows the collection and storage of a very large mass of data regarding the pressure levels actually observed in the hydraulic apparatuses, which allows specifying accurately the need for resistance of the apparatuses for future programs.

According to one embodiment of the invention, the monitoring device comprises an estimator for determining the hydraulic pressure of the apparatus based on values of another hydraulic pressure of another apparatus of the aircraft as a function of time, which are comprised in the measurement data and which have been measured by a measurement sensor provided on this other apparatus.

According to one embodiment of the invention, the processing device comprises an alarm means for transmitting an alarm message to the outside, when the cumulative value of potential damage ratios of the counter is greater than or equal to a predefined alarm threshold.

A second object of the invention is a method for monitoring the lifetime of at least one hydraulic apparatus of an aircraft subjected to variations of hydraulic pressure in flight, a method in which are received, on a reception interface during a reception step, measurement data representative of the hydraulic pressure of the apparatus as a function of flight time, characterized in that during a detection step, a pressure load of a damaging nature, defined by the fact that the pressure comprises a pressure increase, greater than a predetermined damage threshold greater than zero, followed by a pressure reduction greater than the predetermined damage threshold, is detected by a processing device, based on the measurement data, during a calculation step a pressure variation amplitude, equal to the maximum of the absolute value of the pressure increase of the pressure load of a damaging nature and of the absolute value of the pressure reduction of the pressure load of a damaging nature, is calculated by the processing device, during a projection step, the processing device projects the pressure variation amplitude onto a prescribed decreasing curve of damage model or prescribed decreasing straight line of damage model, giving a permissible number of pressure loads of a damaging nature as a function of the pressure variation amplitude, for determining the permissible number of pressure loads of a damaging nature corresponding to the pressure variation amplitude which has been calculated, during another calculation step, the processing device calculates a potential damage ratio equal to a determined number of reference loads, divided by the permissible number of pressure loads of a damaging nature which has been calculated, during a counting step a cumulative counter of potential damage ratio is incremented by the potential damage ratio which has been calculated.

According one embodiment of the invention, in case of missing pressure values between the pressure values that are present, which are spaced over time, replacement pressure values are inserted that vary linearly between these pressure values that are present.

According one embodiment of the invention, the measurement data comprise values of another hydraulic pressure of another apparatus of the aircraft as a function of time, which has been measured by a measurement sensor provided on this other apparatus prior to the reception step, the method comprising an estimation step, which is subsequent to the reception step and anterior to the detection step and during which an estimator of the processing device estimates the hydraulic pressure of the apparatus based on the values of the other hydraulic pressure of the other apparatus of the aircraft.

According one embodiment of the invention, during an alarm step subsequent to the counting step the processing device transmits an alarm message to the outside when the cumulative value of potential damage ratios of the counter is greater than or equal to a predefined alarm threshold.

According one embodiment of the invention, which can be applied to the monitoring device and/or to the monitoring method, the hydraulic apparatus comprises a heat exchanger, forming part of a hydraulic circuit for circulating a hydraulic fluid of a turbomachine, the hydraulic circuit being positioned in the secondary gas flow of the turbomachine positioned between a nacelle and a casing of the turbomachine for cooling the hydraulic fluid.

According one embodiment of the invention, which can be applied to the monitoring device and/or to the monitoring method, the predetermined damage threshold is greater than or equal to 15% of a maximum and nominal hydraulic pressure of the hydraulic apparatus and is less than or equal to 35% of the maximum and nominal hydraulic pressure.

According one embodiment of the invention, which can be applied to the monitoring device and/or to the monitoring method, the prescribed decreasing curve of damage model comprises a decreasing exponential or decreasing linear curve, giving the permissible number of pressure loads of a damaging nature as a function of the pressure variation amplitude.

According one embodiment of the invention, which can be applied to the monitoring device and/or to the monitoring method, the prescribed decreasing curve of damage model comprises a decreasing curve portion, depending on the inverse of the pressure variation amplitude for giving the permissible number of pressure loads of a damaging nature.

Figure 2:
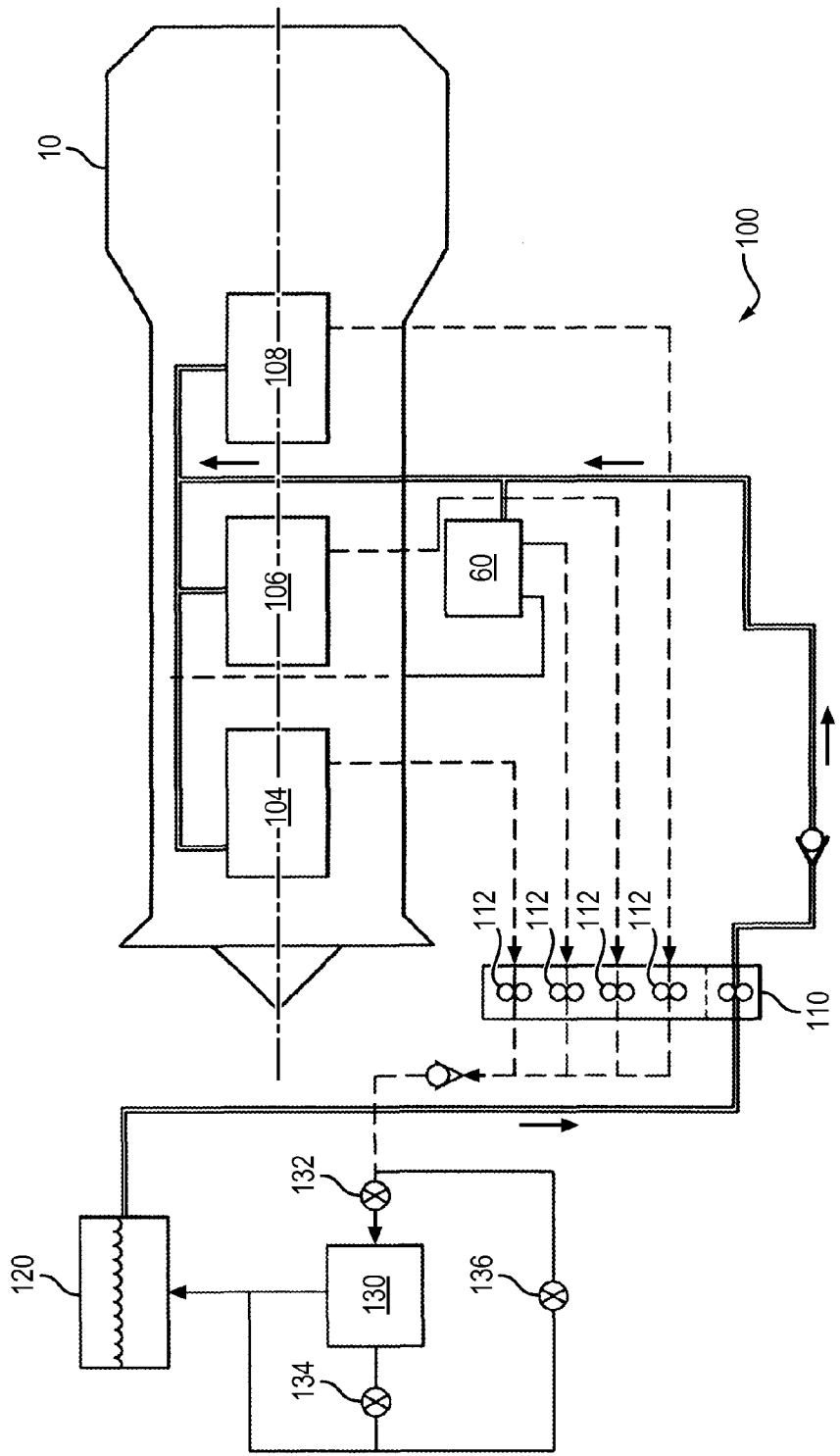
Figure 3:
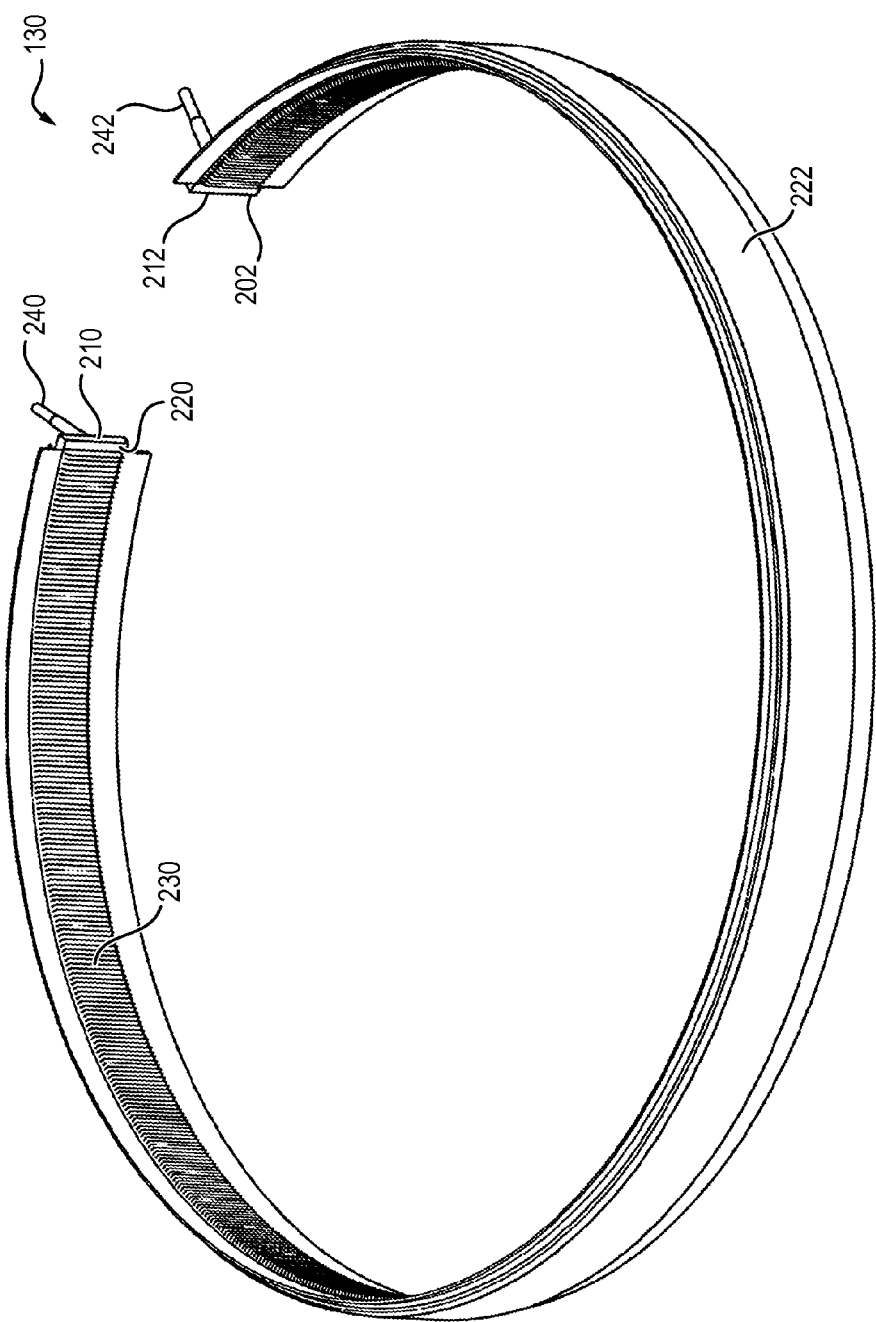
Figure 4:
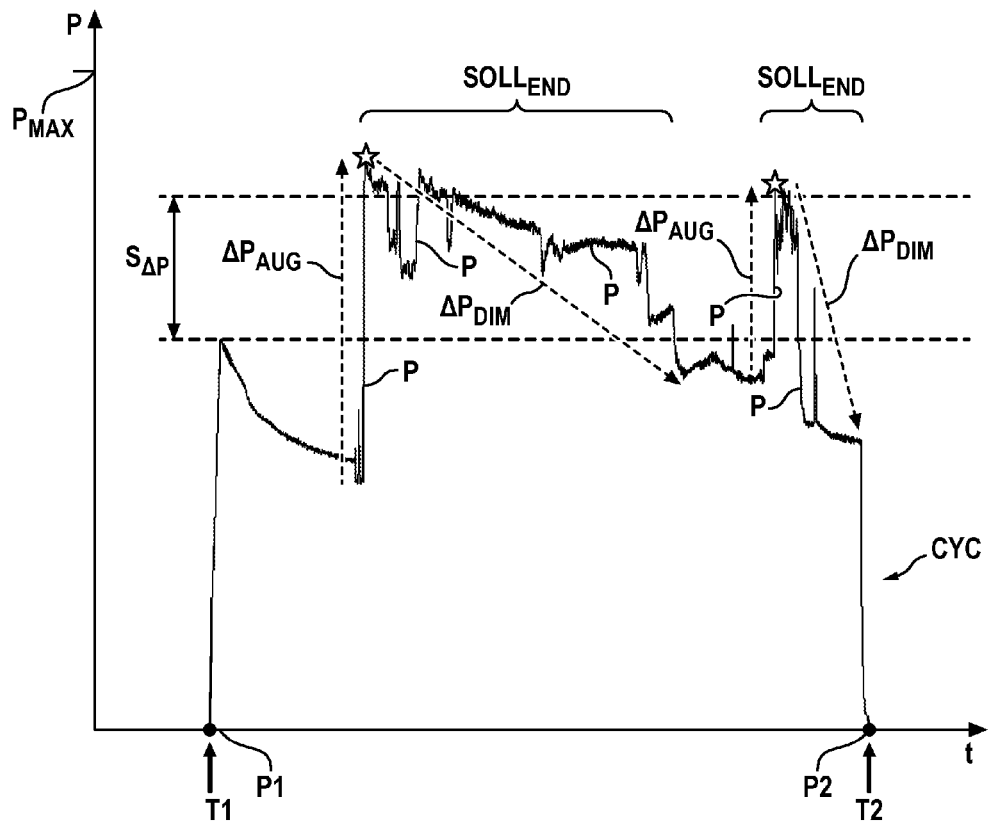
Figure 5:
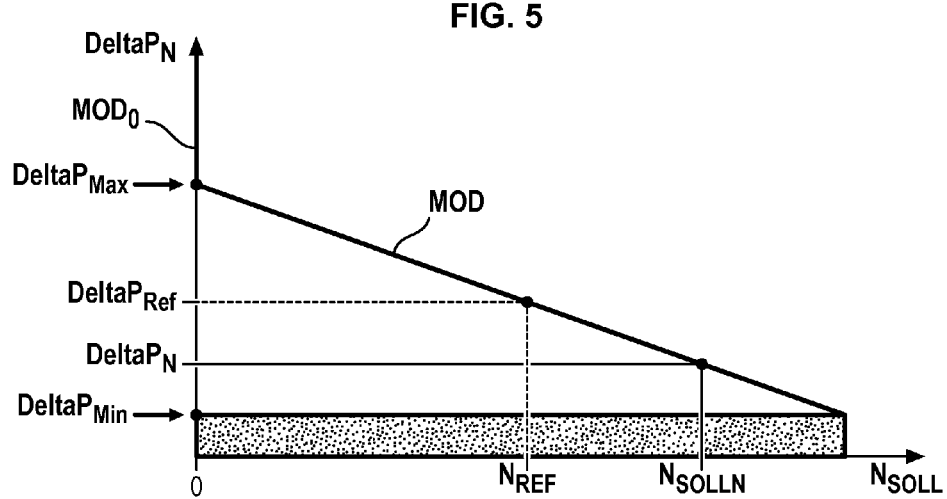
Figure 6:
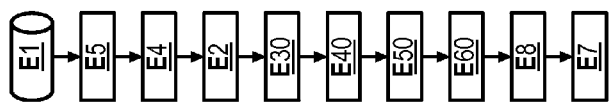
Figure 7:
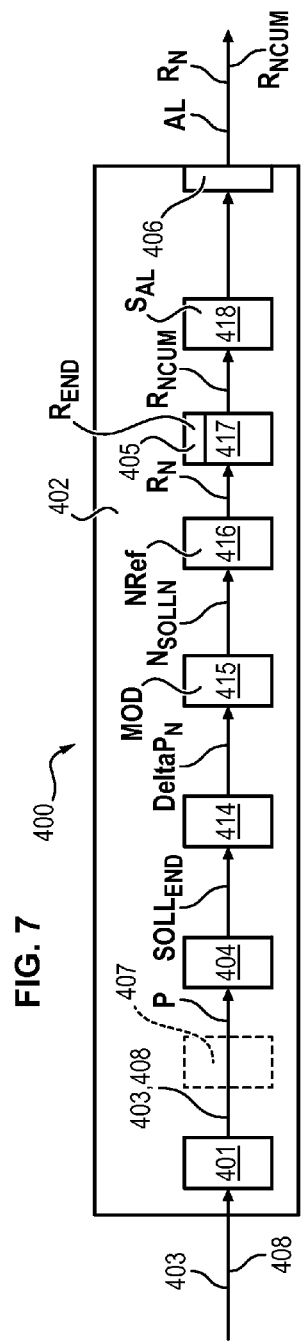

The invention will be better understood upon reading the description that follows, given only by way of a non-limiting example with reference to the appended drawings, in which:

FIG. 1 shows schematically a longitudinal section view of an example of a turbojet, on which is located the apparatus which can be subject to the monitoring device and method according to the invention, FIG. 2 shows schematically an example of a hydraulic lubrication circuit of the turbojet of FIG. 1, comprising the apparatus which can be subject to the monitoring device and method according to the invention, FIG. 3 shows schematically a perspective view of an example of the apparatus which can be subject to the monitoring device and method according to the invention according to FIG. 1, FIG. 4 is a diagram showing schematically an example of pressure loads of a damaging nature which can be detected by the monitoring device and method according to the invention, FIG. 5 is a diagram showing schematically an example of a damage model, giving a permissible number of pressure load cycles of a damaging nature in the abscissa as a function pressure variation amplitude in the ordinate, which can be used by the monitoring device and method according to the invention, FIG. 6 shows an example of a flowchart of the monitoring method according to the invention, FIG. 7 shows schematically an example of the monitoring device according to the invention, FIG. 8 shows schematically another apparatus on which are carried out pressure measurements for the monitoring device and method according to the invention, FIG. 9 is a diagram showing schematically an example of a pressure cycle, in which data are missing, which can be detected by the monitoring device and method according to the invention, and FIG. 10 is a diagram showing schematically and example of a pressure cycle, which can be detected by the monitoring device and method according to the invention and in which the missing data have been replaced according to one embodiment of the invention.

In FIGS. 1, 2 and 3, a hydraulic apparatus of an aircraft subjected to variations of hydraulic pressure in flight and to which the invention can be applied can comprise for example a heat exchanger 130, forming part of a hydraulic circuit 100 for circulating a hydraulic fluid serving for the in-flight operation of a turbomachine 10 or gas turbine 10 engine assembly of an aircraft such as an airplane for example. The hydraulic circuit 100 is for example positioned in the bypass duct 40 of the secondary gas flow 52 of the turbomachine 10, positioned between a nacelle 42 and an external portion 44 or casing 44 of the central engine 13 of the turbomachine 10, for cooling the hydraulic fluid, and is of annular shape for example.

This example of a hydraulic apparatus 130 is first described below in more detail with reference to FIGS. 1, 2 and 3.

In FIG. 1, the gas turbine engine assembly 10 has a longitudinal axis 11. The gas turbine engine assembly 10 comprises a fan assembly 12 and a central gas turbine engine 13. The central gas turbine assembly 13 comprises a high-pressure compressor 14, a combustion chamber 16 and a high-pressure turbine 18. The gas turbine engine assembly 10 can also comprise a low-pressure turbine 20. The fan assembly 12 comprises an array of fan blades 24 extending radially outward from a rotor disk 26. The engine assembly 10 has an intake side 28 and an exhaust side 30. The gas turbine engine assembly 10 also comprises a plurality of sets of bearings (not shown in the figures) used for supplying a rotating and axial support to the fan assembly 12, to the high-pressure compressor 14, and to the low-pressure turbine 20, for example.

In operation, the air flows through the fan assembly 12 and a first portion 50 (primary flow 50) of the air flow is channeled through the high-pressure compressor 14, in which the air flow is compressed and sent to the combustion chamber 16. The hot combustion products (not shown in the figures) originating in the combustion chamber 16 are used to drive the turbines 18 and 20 and thus produce the thrust of the gas turbine engine assembly 10. The gas turbine engine assembly also comprises a bypass duct 40 which is used to pass a second portion 52 (secondary flow 52) of the air flow discharged from the fan assembly 12 around the central gas turbine engine 13. More precisely, the bypass duct 40 extends between an internal wall 201 of a fan shroud 42 or nacelle 42 and an external wall 203 of the separator 44 surrounding the central gas turbine engine 13.

FIG. 2 is a simplified schematic illustration of an example of a hydraulic circuit 100 for supplying hydraulic lubrication fluid, such as oil for example, which can be used in the gas turbine engine assembly 10 of FIG. 1. In the exemplary embodiment, the system 100 comprises an oil supply source 120, one or more pumps 110 and 112 which circulate the oil in bearings 104, 106, 108 of the central gas turbine engine 13 and in its gearings 60 and return the hot oil via the heat exchanger 130, which cools the oil to a lower temperature. Possibly, the heat exchanger 130 comprises an intake valve 132 and an outlet valve 134 and a bypass valve 136 which can be manually or electrically actuated.

In the example shown in FIG. 1, the heat exchanger 130 is an air-cooled heat exchanger which is positioned in the bypass duct 40. The heat exchanger 130 is coupled to the interior wall 201 of the fan shroud 42 between the fan assembly 12 and a fan strut 150. In other embodiments, not shown, the heat exchanger 130 can be coupled to the interior wall 201, upstream of the fan assembly 12 and downstream of the intake side 28. As such, the heat exchanger 130 can be positioned anywhere along the axial length of the bypass duct 40, either on the interior side of the fan shroud 42, or on the external wall 203 of the separator 44. In FIG. 3, during assembly, the heat exchanger 130 is curved in such a way that the heat exchanger assembly 130 has a circumferential and axial profile substantially similar to the circumferential and axial profile of at least a portion of the bypass duct 40, for example conforming to the circumferential and axial profile of the interior surface 201 of the fan shroud 42 as shown in FIG. 1 or the exterior surface 203 of the separator 44 in other embodiments, not shown.

As shown in FIG. 3, the heat exchanger 130 covers substantially the totality (approximately 320°) of the circumference. As a variant, the heat exchanger can be formed from several segments, which are mounted end to end to cover the same circumferential length.

In FIG. 3, the heat exchanger 130 comprises a collector portion 202 extending between a first end 210 and a second opposite end 212. The collector portion 202 also comprises a radially internal surface 220, a radially external surface 222, so that the collector portion 202 has a substantially rectangular axial transverse section profile. The portion forming a collector 202 also comprises a plurality of cooling fins 230 extending radially toward the interior from the interior surface 220 in the case of FIG. 1, to be turned toward the secondary flow 52. Of course, the fins 230 can be positioned on the exterior surface 222, for example in embodiments where the heat exchanger 130 is mounted on the exterior surface 203 of the separator 44 or on the exterior surface of the fan shroud 42. Of course, the fins 230 can be positioned both on the exterior surface 222 and on the interior surface 220.

The collector portion 202 also comprises at least one passage channel of the hydraulic fluid extending in the collector portion 202 between its ends 210 and 212. This passage channel of the hydraulic fluid is linked to at least one hydraulic fluid inlet connection 240, which is positioned at the end 210 and which is coupled downstream of the valve 132 (shown in FIG. 2), and to at least one hydraulic fluid outlet connection 242, which is positioned at the end 212 and which is coupled upstream of the valve 134 (shown in FIG. 2), so that the valves 132 and 134 can be actuated to circulate the lubrication fluid of the system 100 through the channel of the heat exchanger 130. The hydraulic fluid circulating in the heat exchanger 130 yields a portion of its heat to the collector portion 202 surrounding the channel, this collector portion 202 yielding by means of the fins 230 a portion of the heat received to the secondary flow of air passing in the bypass duct 40 or to the air passing outside the shroud 42.

Described first below with reference to FIGS. 4 to 10 are embodiments of the device 400 for monitoring the lifetime of the hydraulic apparatus or hydraulic equipment according to the invention and of the method for monitoring the lifetime of the hydraulic apparatus or hydraulic equipment according to the invention, having the steps mentioned below. Of course, the device 400 for monitoring the lifetime of the hydraulic apparatus according to the invention and the method of monitoring the lifetime of the hydraulic apparatus according to the invention can be applied to any hydraulic apparatus of an aircraft subjected in flight to variations of hydraulic pressure, this apparatus possibly being different from the heat exchanger 130 described above and being designated generally below by hydraulic apparatus 130.

As illustrated in FIGS. 6 and 7, the device 400 for monitoring the lifetime of the hydraulic apparatus according to the invention and the method for monitoring the lifetime of the hydraulic apparatus according to the invention are intended to process measurement data 403, which have been acquired during a flight on the aircraft and which are representative of the hydraulic pressure P (for example in the example described above in FIGS. 1 to 3, the internal oil pressure P of the hydraulic apparatus 130) of the hydraulic apparatus 130 as a function of time t during this flight, to process these data 403 on the ground after the flight. The device 400 thus comprises a reception interface 401 for receiving the measurement data 403 (or input data) during a first reception step E1. The device 400 is configured to implement the method for monitoring the lifetime of the hydraulic apparatus.

The device 400 comprises a processing device 402 connected to the reception interface 401. The device 400 and the method for monitoring the lifetime are implemented by automatic means. The processing device 402 and the means described can be implemented by a processor or a calculator or a computer or a server, which are equipped with data processing programs for carrying out the processing described below and with permanent memories for recording the measurement data 403 and the processing carried out, the interface 401 possibly being an access port to them.

The processing device 402 comprises a detector 404 for detecting, based on the measurement data 403 during a second detection step E2 subsequent to the first reception step E1, a pressure P load $SOLL_{END}$ of a damaging nature, hereafter designated damaging pressure load $SOLL_{END}$.

As illustrated in FIG. 4 showing in the ordinate a pressure P curve as a function of time t in the abscissa, the pressure P load $SOLL_{END}$ of a damaging nature is detected by the fact that the pressure P comprises a pressure increase $\Delta P_{AUG}$, greater than a predetermined damage threshold $S_{\Delta P}$, this pressure increase $\Delta P_{AUG}$ being followed by a pressure reduction $\Delta P_{DIM}$ greater than the predetermined damage threshold $S_{\Delta P}$. The predetermined damage threshold $S_{\Delta P}$ is a fatigue threshold of the hydraulic apparatus 130 and has been determined beforehand. The predetermined damage threshold $S_{\Delta P}$ is positive and not zero. The pressure increase $\Delta P_{AUG}$ and the pressure reduction $\Delta P_{DIM}$ are each taken as their absolute values.

A pressure P cycle CYC of the hydraulic apparatus 130 in flight begins at a certain starting instant T1 with a first prescribed pressure value P1 and terminates at a certain finishing instant T2 by a second prescribed pressure value P2. The pressure P cycle CYC can comprise no, one or more pressure P loads $SOLL_{END}$ of a damaging nature, after having taken the first prescribed pressure value P1 starting the cycle and before taking the second prescribed pressure value P2 ending the cycle subsequently to the first prescribed pressure value P1. For example, in FIG. 4, two pressure P loads $SOLL_{END}$ of a damaging nature are detected. In FIG. 4, the maximum of the pressure P separating the increase $\Delta P_{AUG}$ from the reduction $\Delta P_{DIM}$ is represented by a star.

The processing device 402 comprises a calculating means 414 for calculating, during a calculation step E30 subsequent to the detection step E2, a pressure variation amplitude $DeltaP_N$, equal to the maximum of the absolute value of the pressure increase $\Delta P_{AUG}$ of the pressure P load $SOLL_{END}$ of a damaging nature which has been detected and of the absolute value of the pressure reduction $\Delta P_{DIM}$ of the pressure P load $SOLL_{END}$ of a damaging nature, which follows this pressure increase $\Delta P_{AUG}$.

The processing device 402 comprises a projection means 415 comprising a damage model in the form of a function $DeltaP_N=f(N_{SOLL})$ giving a permissible number $N_{SOLL}$ of pressure P loads of a damaging nature as a function of the pressure variation amplitude $DeltaP_N$.

One example of a damage model MOD of this type is illustrated in FIG. 5, comprising a prescribed decreasing straight line MOD of damage model, giving the permissible number $N_{SOLL}$ of pressure P loads of a damaging nature as a function of the pressure variation amplitude $DeltaP_N$. For example, the prescribed straight line MOD of damage model is in the form of the following affine function:

$$DeltaP_N = A \cdot N_{SOLL} + B,$$

where A is a prescribed real, negative nonzero value,
and B is a prescribed real, positive nonzero value.

The model can be other than the example of FIG. 5, for example in the form of a prescribed decreasing curve MOD of damage model giving the permissible number $N_{SOLL}$ of pressure P loads of a damaging nature as a function of the pressure variation amplitude $DeltaP_N$.

In another example, the prescribed decreasing curve MOD of damage model is in the form of the following function:

$$DeltaP_N = C \cdot \exp(-D \times N_{SOLL} + E) + F,$$

where C is a prescribed real, positive nonzero value,
D is a prescribed real, positive nonzero value,
E and F are prescribed real values.

In another example, the prescribed decreasing curve MOD of damage model comprises a decreasing curve portion depending on the inverse of the pressure variation amplitude $DeltaP_N$ to give the permissible number $N_{SOLL}$ of pressure P loads of a damaging nature. The curve MOD can be in the form of the following function:

$$DeltaP_N = G/N_{SOLL} + H,$$

where G is a prescribed real, positive nonzero value,
H is a prescribed real value.

The projection means 415 is provided for projecting, during a projection step E40 subsequent the calculation step E30, the pressure variation amplitude $DeltaP_N$ which was calculated during step E30, onto the prescribed decreasing curve MOD of damage model or prescribed decreasing straight line MOD of damage model, for determining the permissible number $N_{SOLLN}$ of pressure P loads of a damaging nature corresponding to this pressure variation amplitude $DeltaP_N$ which has been calculated.

Generally, regardless of the form of the function, the damage model $DeltaP_N=f(N_{SOLL})$ is characterized by the following specific pressures:

$DeltaP_{Max}$: pressure variation amplitude $DeltaP_N$ from which the apparatus has a plastic deformation starting with the first load $SOLL_{END}$; at $DeltaP_{Max}$ it is assumed that the lifetime of the apparatus 130 is entirely consumed.

$DeltaP_{Ref}$: reference pressure variation amplitude $DeltaP_N$; for $DeltaP_{Ref}$, it is assumed that the lifetime is equal to a permissible number $N_{SOLL}$ of pressure P loads of a damaging nature, which is prescribed and which is called the reference number of loads NRef.

$DeltaP_{Min}$: pressure variation amplitude $DeltaP_N$ below which the pressure variation amplitudes $DeltaP_N$ are no longer taken into account because they are considered non-damaging for the apparatus 130 considered. This is the predetermined damage threshold $S_{\Delta P}$ allowing detecting a pressure P load $SOLL_{END}$ of a damaging nature. We therefore have $DeltaP_{Min}=S_{\Delta P}$.

The processing device 402 comprises a calculating means 416 for calculating, during another calculation step E50, a potential damage ratio $R_N$ equal to the predetermined number NRef of reference loads, divided by the permissible number $N_{SOLLN}$ of pressure P loads of a damaging nature, which has been calculated, namely:

$$R_N = NRef/N_{SOLLN}$$

The monitoring method and the device according to the invention thus allow estimating the severity of the loads $SOLL_{END}$ encountered during the flight.

The pressure P load $SOLL_{END}$ of a damaging nature, the pressure variation amplitude $DeltaP_N$, the permissible number $N_{SOLLN}$ of pressure P loads of a damaging nature and the damage ratio $R_N$ are associated with the flight of the aircraft during which the measurement data 403 and/or 408 were acquired.

The processing device 402 comprises a means 417 for incrementing, during a counting step E60, a cumulative value $R_{NCUM}$ counter 405 of potential damage ratios $R_N$. The cumulative value $R_{NCUM}$ counter 405 is incremented by the potential damage ratio $R_N$, which was calculated during the step E50 for the flight corresponding to the data 405 and/or 408. The ratio $R_N$ therefore allows tracking the flight by allowing quantifying the severity of the pressure loads $SOLL_{END}$ undergone by the apparatus during the flight. The counter 405 therefore allows tracking of the flight while taking into account the preceding flights. The counter 405 thus supplies a cumulative value $R_{NCUM}$ of potential damage ratios $R_N$ for this flight and the preceding flights.

The cumulative counter 405 of damage ratios is thus a counter of weighted pressure loads $SOLL_{END}$, which calculates and accumulates, during the life of the apparatus 130, a number of loads equivalent to pressure reference conditions for each pressure load $SOLL_{END}$ detected during the flights. Each load $SOLL_{END}$ is weighted relative to its pressure variation amplitude $DeltaP_N$, so as to normalize the load $SOLL_{END}$ to reference conditions.

These reference conditions correspond to the reference pressure variation amplitude $DeltaP_{Ref}$ associated with the number NRef of pressure P loads $SOLL_{END}$ of a damaging nature that the apparatus can tolerate at this amplitude before failure (which can be manifested by the appearance of cracks, ruptures . . . ). The selected reference conditions DeltaPRef correspond to a pressure for which the number of permissible loads NRef=$N_{SOLLN}$ that the apparatus can tolerate prior to failure is known; NRef will for example have been demonstrated during certification or qualification tests of the apparatus 130. It is however possible to define another reference (pressure, number of loads) provided that it is the same for all the recorded loads $SOLL_{END}$. The weighting of each load $SOLL_{END}$ relative to these reference pressure conditions thus allows establishing the cumulative counter 405 which it is possible to compare to the reference number NRef of loads. The cumulative value $R_{NCUM}$ of potential damage ratios $R_N$ calculated by the counter 405 represents a damage potential normalized to the reference pressure variation amplitude $DeltaP_{Ref}$ conditions.

Thus, in the case where $DeltaP_{Min} < DeltaP_N < DeltaP_{Ref}$, the counter 405 is incremented by a potential damage ratio $R_N$ less than 1 by the incrementation means 417 during step E60, in the case where $DeltaP_N = DeltaP_{Ref}$, the counter is incremented by a potential damage ratio $R_N$ equal to 1 by the incrementation means 417 during step E60, in the case where $DeltaP_{Ref} < DeltaP_N < DeltaP_{Max}$, the counter is incremented by a potential damage ratio $R_N$ greater than 1 by the incrementation means 417 during step E60.

According to one embodiment, in the case where $DeltaP_N \leq DeltaP_{Min}$, the counter 405 is not incremented by the incrementation means 417 during step E60.

According to one embodiment, in the case where $DeltaP_N \geq DeltaP_{Max}$, the permissible number $N_{SOLLN}$ of pressure P loads of a damaging nature is equal to 0, as shown by the straight line $MOD_0$ illustrated in FIG. 5. In this case, the counter 405 is incremented by an "infinite" potential damage ratio $R_N$ (because $N_{SOLLN}=0$) or equal to a prescribed value $R_{END}$ of attained damage, arbitrarily selected to be very large, by the incrementation means 417 during step E60; the lifetime of the apparatus 130 is considered to be fully consumed. This prescribed value $R_{END}$ of attained damage is for example selected to be a finite value, greater than or equal to a predefined alarm threshold $S_{AL}$.

According to one embodiment of the invention, the processing device 402 comprises an alarm means 418 for transmitting to the outside, during an alarm step E8 subsequent to the step E60, an alarm message AL, when the cumulative value $R_{NCUM}$ of damage potential ratios $R_N$ is greater than or equal to the predefined alarm threshold $S_{AL}$, as shown in FIG. 7. Thus, for example, the case where $DeltaP_N \geq DeltaP_{Max}$ will trigger through the alarm means 418 the transmission of the alarm message AL.

Thus this counter 405 reports different transient increases/drops of the pressure P in the apparatus 130 during its life, normalized to conditions equivalent to the reference conditions. It is a precise counter allowing stating the mechanical damage status of the apparatus 130, because it allows comparing the permissible number $N_{SOLLN}$ of pressure P loads of a damaging nature to the theoretically permissible number of cycles NRef, associated with the reference pressure variation amplitude DeltaPRef.

The cumulative value $R_{NCUM}$ of potential damage ratios RN calculated by this counter 405 is not necessarily an integer; the cumulative value $R_{NCUM}$ is to be interpreted as the number of pressure P loads $SOLL_{END}$ of a damaging nature to which the apparatus 130 would have been subjected by accomplishing only loads $SOLL_{END}$ at the reference pressure variation amplitude $DeltaP_{Ref}$.

According to one embodiment of the invention, the predetermined damage threshold $S_{AP}$ is greater than or equal to 15%, of a maximum and nominal hydraulic pressure $P_{MAX}$ of the hydraulic apparatus and is less than or equal to 35%, of the maximum and nominal hydraulic pressure $P_{MAX}$. The predetermined damage threshold $S_{AP}$ can in particular be greater than or equal to 20%, of $P_{MAX}$ and less than or equal to 30%, of $P_{MAX}$. For example, the predetermined damage threshold $S_{AP}$ can be substantially equal to 25%, of $P_{MAX}$.

The predetermined damage threshold $S_{AP}$, the model MOD, $DeltaP_{Ref}$, NRef, $DeltaP_{Min}$, $DeltaP_{Max}$, $S_{AL}$, the first prescribed pressure value P1 and the second prescribed pressure value P2 are part of the configuration parameters of the method and of the device 400, and are pre-recorded in a memory of the processing device 402. The amplitude $DeltaP_N$ and/or the number $N_{SOLLN}$ and/or the ratio $R_N$ and/or the cumulative value $R_{NCUM}$, which have been calculated, are recorded in a memory of the processing device 402, which is updated at each execution. The processing device 402 can comprise an output interface 406 (which can be a display screen or other) to supply as output data to the outside, during an output step E7 subsequent to the step E8 or E60, the amplitude $DeltaP_N$ and/or the number $N_{SOLLN}$ and/or the ratio $R_N$ and/or the cumulative value $R_{NCUM}$, which have been calculated, and/or the alarm message AL and possibly other indicators such as the predetermined damage threshold $S_{AP}$, the model MOD, $DeltaP_{Ref}$, NRef, $DeltaP_{Min}$, $DeltaP_{Max}$, $S_{AL}$, the first prescribed pressure value P1 and the second prescribed pressure value P2.

According to one embodiment of the invention, these configuration parameters are predefined depending on the materials of the hydraulic apparatus 130 and on its structure. These configuration parameters can be fixed for the same type of hydraulic apparatus 130 and/or for the same type of aircraft. According to one embodiment of the invention, the predetermined damage threshold $S_{AP}$ can be variable during the life of the apparatus 130.

According to one embodiment of the invention, the first prescribed pressure value P1 and the second prescribed pressure value P2 are substantially zero. The first prescribed pressure value P1 can correspond to a pressure value of the hydraulic apparatus 130 with the turbojet stopped at the beginning of the flight or with the turbojet idling shortly after the beginning of the flight, in which case the first prescribed pressure value P1 is not zero. The second prescribed pressure value P2 can correspond to a pressure value of the hydraulic apparatus 130 with the turbojet stopped at the end of the flight or with the turbojet idling shortly before the end of the flight, in which case the second prescribed pressure value P2 is not zero.

According to one embodiment of the invention, shown in FIGS. 7 and 8, the hydraulic apparatus 130 may not be equipped with a pressure sensor for measuring its hydraulic pressure P. In this case, the processing device 402 comprises an estimator 407 for determining, during an estimation step E4 subsequent to the reception step E1 and anterior to the detection step E2, the hydraulic pressure P of the apparatus 130 based on values 408 of another hydraulic pressure of another apparatus 131 or other equipment of the aircraft as a function of time t, which are comprised in the measurement data 403 and which have been measured by a measurement sensor 133 provided on this other apparatus. This other apparatus 131 can for example be a part of the same hydraulic circuit 100 as the hydraulic apparatus 100 of FIG. 2, the sensor 133 allowing for example measuring the internal oil pressure of the central engine 13 of the turbomachine 10 and being provided on this engine 13. The estimator 407 can comprise a pre-recorded hydraulic model or a pre-recorded function allowing calculating or predicting the hydraulic pressure P of the apparatus 130 based on values 408 of the other hydraulic pressure of the other apparatus 131. This has the advantage of having no impact on the design, the mass, the performance or the cost of the hydraulic apparatus.

In another embodiment of the invention, not shown, the hydraulic apparatus 130 is equipped with a measurement sensor allowing measuring directly the hydraulic pressure P of the hydraulic apparatus 130.

Pressure values P3 may be missing between the pressure values that are present, which are spaced over time. For example, as shown in FIG. 9 during a pressure cycle CYC, pressure values P3 may be missing between the starting instant T1 corresponding to the first prescribed pressure value P1 and a present pressure P subsequent to P1 (or in another case, not shown, between a present pressure P before the second prescribed pressure value P2 and the finishing instant T2 corresponding to the second prescribed pressure value P2).

According to one embodiment of the invention, during a step E5 of data verification by means of the detector 404 of the processing device 402, linearly varying replacement values P4 are inserted, for example in the form of a single straight line, between these values of pressure P that are present, P1 or P2, for example between the starting instant T1 corresponding to the first prescribed pressure value P1 and the present pressure P, as illustrated in FIG. 10 (or in the other aforementioned case, the processing device 402 inserts replacement pressure values P4, varying linearly, for example in the form of a single straight line, between the present pressure P and the finishing instant corresponding to the second prescribed pressure value).

According to one embodiment of the invention, the method comprises, between the reception step E1 and the step E2 or E4, the data 403 or 408 verification step E5, for example for detecting invalid data, detecting missing data and applying methods for replacing missing data, as described above with reference to FIGS. 9 and 10. The data 403, 408 can also comprise pressure P measurements and time t measurements, the serial number of the engine, the number of flights counted by another counter of the turbojet, a serial number of the tracked hydraulic apparatus, a history of the pressure measurements P.

According to one embodiment of the invention, the method comprises a step of calculating a confidence indicator of the amplitude $DeltaP_N$ and/or of the number $N_{SOLLN}$ and/or of the ratio RN and/or of the cumulative value $R_{NCUM}$ which have been calculated. This confidence indicator can be calculated as being a numerical value weighted by the quality of the data 403 and/or 408, estimated during the step E2 and by the number of missing data.

Of course, the embodiments, features, possibilities and examples above can be combined together or be selected independently from one another.

The invention claimed is:

1. A device for monitoring the lifetime of at least one hydraulic apparatus of an aircraft subjected to variations of hydraulic pressure in flight, the device comprising an interface for receiving measurement data representative of the hydraulic pressure of the at least one hydraulic apparatus as a function of flight time, the at least one hydraulic apparatus comprising:
a processing device comprising a detector for detecting, based on the measurement data, a pressure load of a damaging nature, defined by the fact that the pressure comprises a pressure increase, greater than a predetermined damage threshold greater than zero, followed by a pressure reduction greater than the predetermined damage threshold,
a calculator for calculating a pressure variation amplitude, equal to the maximum of the absolute value of the pressure increase of the pressure load of a damaging nature and of the absolute value of the pressure reduction of the pressure load of a damaging nature,
a calculator for projecting the pressure variation amplitude onto a prescribed decreasing curve of damage model or a prescribed decreasing straight line of damage model, giving a permissible number of pressure loads of a damaging nature as a function of the pressure variation amplitude, for determining the permissible number of pressure loads of a damaging nature corresponding to the pressure variation amplitude which has been calculated,
a calculator for calculating a potential damage ratio, equal to a determined number of reference loads, divided by the permissible number of pressure loads of a damaging nature which has been calculated, and
a cumulative potential ratio counter incremented by the potential damage ratio which has been calculated.

2. The device according to claim 1, comprising an estimator for determining the hydraulic pressure of the at least one hydraulic apparatus based on values of another hydraulic pressure of another apparatus of the aircraft as a function of time, which are comprised in the measurement data and which have been measured by a measurement sensor provided on the other apparatus.

3. The device according to claim 1, wherein the at least one hydraulic apparatus comprises a heat exchanger, forming part of a hydraulic circuit for circulating a hydraulic fluid of a turbomachine, the hydraulic circuit being positioned in a secondary gas flow of the turbomachine positioned between a nacelle and a casing of the turbomachine for cooling the hydraulic fluid.

4. The device according to claim 1, wherein the predetermined damage threshold is greater than or equal to 15% of a maximum and nominal hydraulic pressure of the at least one hydraulic apparatus and is less than or equal to 35% of the maximum and nominal hydraulic pressure.

5. The device according to claim 1, wherein the prescribed decreasing curve of damage model comprises a decreasing exponential or decreasing linear curve giving the permissible number of pressure loads of a damaging nature as a function of the pressure variation amplitude.

6. The device according to claim 1, wherein the prescribed decreasing curve of damage model comprises a decreasing curve portion depending on the inverse of the pressure variation amplitude for giving the permissible number of pressure loads of a damaging nature.

7. The device according to claim 1, wherein the processing device comprises an alarm interface for transmitting an alarm message to the outside, when a cumulative value of potential damage ratios of the cumulative potential ratio counter is greater than or equal to a predefined alarm threshold.

8. A method for monitoring the lifetime of at least one hydraulic apparatus of an aircraft subjected to variations of hydraulic pressure in flight, the method comprising receiving, on a reception interface during a reception step, measurement data representative of the hydraulic pressure of the at least one hydraulic apparatus as a function of flight time, characterized in that detecting, during a detection step, a pressure load of a damaging nature, defined by the fact that the pressure comprises a pressure increase, greater than a predetermined damage threshold greater than zero, followed by a pressure reduction greater than the predetermined damage threshold, is detected by a processing device, based on the measurement data, calculating, during a calculation step a pressure variation amplitude, equal to the maximum of the absolute value of the pressure increase of the pressure load of a damaging nature and of the absolute value of the pressure reduction of the pressure load of a damaging nature, by the processing device, projecting, during a projection step, by the processing device the pressure variation amplitude onto a prescribed decreasing curve of damage model or prescribed decreasing straight line of damage model, giving a permissible number of pressure loads of a damaging nature as a function of the pressure variation amplitude, for determining the permissible number of pressure loads of a damaging nature corresponding to the pressure variation amplitude which has been calculated, calculating, during another calculation step, by the processing device a potential damage ratio equal to a determined number of reference loads, divided by the permissible number of pressure loads of a damaging nature which has been calculated, and incrementing, during a counting step a cumulative counter of potential damage ratio by the potential damage ratio which has been calculated.

9. The method according to claim 8, comprising in case of missing pressure values between the pressure values that are present, which are spaced over time, inserting replacement pressure values that vary linearly between the pressure values that are present.

10. The method according to claim 8, wherein in that the measurement data comprise values of another hydraulic pressure of another apparatus of the aircraft as a function of time, which has been measured by a measurement sensor provided on this other apparatus prior to the reception step, the method comprising estimating, during an estimation step, which is subsequent to the reception step and anterior to the detection step, by an estimator of the processing device estimates the hydraulic pressure of the at least one hydraulic apparatus based on the values of the other hydraulic pressure of the other apparatus of the aircraft.

11. The method according to claim 8, wherein the at least one hydraulic apparatus comprises a heat exchanger, forming part of a hydraulic circuit for circulating a hydraulic fluid of a turbomachine, the hydraulic circuit being positioned in a secondary gas flow of the turbomachine positioned between a nacelle and a casing of the turbomachine for cooling the hydraulic fluid.

12. The method according to claim 8, wherein the predetermined damage threshold is greater than or equal to 15% of a maximum and nominal hydraulic pressure of the at least one hydraulic apparatus and is less than or equal to 35% of the maximum and nominal hydraulic pressure.

13. The method according to claim 8, wherein the prescribed decreasing curve of damage model comprises a decreasing exponential or decreasing linear curve, giving the permissible number of pressure loads of a damaging nature as a function of the pressure variation amplitude.

14. The method according to claim 8, wherein the prescribed decreasing curve of damage model comprises a decreasing curve portion, depending on the inverse of the pressure variation amplitude for giving the permissible number of pressure loads of a damaging nature.

15. The method according to claim 8, comprising transmitting, during an alarm step subsequent to the counting step by the processing device transmits an alarm message to the outside when the cumulative value of potential damage ratios of the cumulative counter of potential damage ratio is greater than or equal to a predefined alarm threshold.

* * * * *